A. L. PERSYN.
GAME BOARD AND ACCESSORIES.
APPLICATION FILED NOV. 24, 1914.

1,216,355.

Patented Feb. 20, 1917.

Inventor
A. L. Persyn.

Witnesses
Attorney

UNITED STATES PATENT OFFICE.

ANDREW L. PERSYN, OF NEWPORT, WASHINGTON.

GAME-BOARD AND ACCESSORIES.

1,216,355.

Specification of Letters Patent. Patented Feb. 20, 1917.

Application filed November 24, 1914. Serial No. 873,796.

*To all whom it may concern:*

Be it known that I, ANDREW L. PERSYN, citizen of the United States, residing at Newport, in the county of Pend Oreille and State of Washington, have invented certain new and useful Improvements in Game-Boards and Accessories; and I do hereby declare the following to be a full, clear, and exact description of the invention, such as will enable others skilled in the art to which it appertains to make and use the same.

This invention relates to game boards and the principal object of this invention is to provide a rectangular board to have outlined thereon a series of curved lines, and the words "The spider and the flies" marked thereon. This game will be most interesting and entertaining to the players and will make a contest depending somewhat upon the player's skill and his movements.

A further object of this invention is the provision of a board having a rectangular outline on one face thereof, and having a series of circular and curved lines intersecting the circular lines in the rectangular outline. A central circle is placed within the rectangular outline, and a plurality of smaller circles are placed on the face of the board at the points of intersection of the curved lines with the circular lines which circles are in different colors, generally in blue and red, or other contrasting colors and divide the board in two separate playing surfaces.

The foregoing and other objects may be attained by means of the construction and arrangement shown in the drawings: in which.

Figure 1:
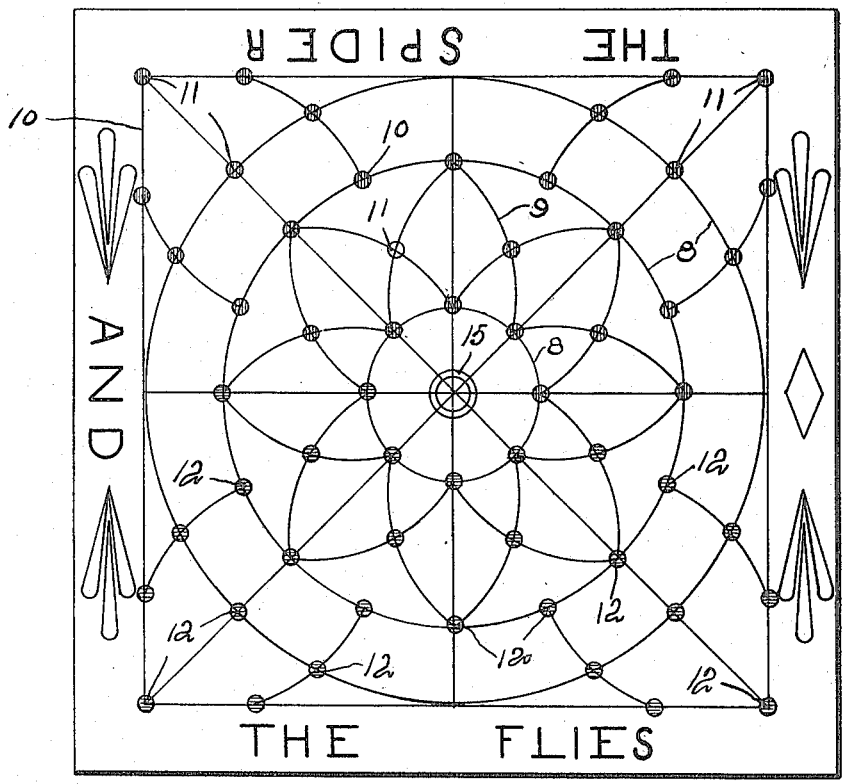
Figure 1 is a plan view of the board made in accordance with this invention.
Figure 2:
Fig. 2 is a perspective view of the disks representing the flies.
Figure 3:
Fig. 3 is a perspective view of the larger checker representing the spider.

Referring to the drawings, the numeral 8 designates a series of circles, and 9 are curved lines extending from one circle to the other, said circles being inclosed within the rectangular border line 10. Displayed upon the board are the words "The spider and the flies."

The parts intersecting the circles with curved lines are the smaller circles 11 and 12 which are in contrasting colors, preferably red and blue, on opposite sides of the board as indicated in Fig. 1.

The rules for playing the game are as follows:

The smaller disks represent the flies, and are placed on the twenty red spots on one side and the spider is represented by the larger round disk which is placed on the center of the board.

The players are divided into sides, one playing the spider and the other playing the flies.

It being understood that the flies always have the first move, then the spider following, then the flies again, etc. The player using the flies is supposed to corner the spider if possible, and the player using the spider is to jump the flies, removing the same from the board as he does so. If the spider, or the one using the larger checker jumps all of the smaller checkers representing the flies before he is cornered, the spider wins the game, but should it be that the smaller checkers corner the larger checker the one taking the part of the flies wins the game.

It being understood that the spider can jump one or as many flies as there are flies on either the red or blue spots, it being understood that the flies are placed on all of the red spots or all of the blue spots as decided upon by the player, and the spider has to jump on a line and cannot turn a corner at the same time.

If the spider jumps all the flies off the board or there are not enough flies left on the board to corner him, the player using the spider wins the game, as before stated.

The game can also be played as follows: This game can be played as above mentioned, except the idea is for the flies to drive or force the spider to the center of the board, and corner him so that the spider cannot get out, or in other words the spider cannot move, and the flies win the game, it being understood that the spider can jump the flies as herebefore explained, and should he jump all the flies before being cornered, the spider wins the game.

From the foregoing it will be apparent that the game is quite a difficult one to play successfully, and is interesting and usually the contest is very sharp.

Various changes may be made in the detail of construction without departing from the spirit and scope of the invention as defined in the claim.

What is claimed is:

A game board having a rectangular outline on the face thereof, a plurality of concentric circles on the face of the board within the rectangular outline, curved lines intersecting the circles, spots at the intersection of the curved lines with the circles, said spots being of contrasting colors on opposite sides of the board, a plurality of smaller checkers and a larger checker, said checkers representing the objects to be used in the game, substantially as set forth.

In testimony whereof I affix my signature in presence of two witnesses.

ANDREW L. PERSYN.

Witnesses:
CHAS. H. LEAVY,
E. T. SHELDON.

Copies of this patent may be obtained for five cents each, by addressing the "Commissioner of Patents, Washington, D. C."